July 23, 1929.  J. J. CARTER  1,721,810

METHOD AND MEANS FOR FORMING ARMATURE CONDUCTORS

Filed Oct. 25, 1924  12 Sheets-Sheet 1

Inventor
John J. Carter
By Spencer, Small and Hardman
his Attorneys

July 23, 1929.　　　J. J. CARTER　　　1,721,810
METHOD AND MEANS FOR FORMING ARMATURE CONDUCTORS
Filed Oct. 25, 1924　　12 Sheets-Sheet 2
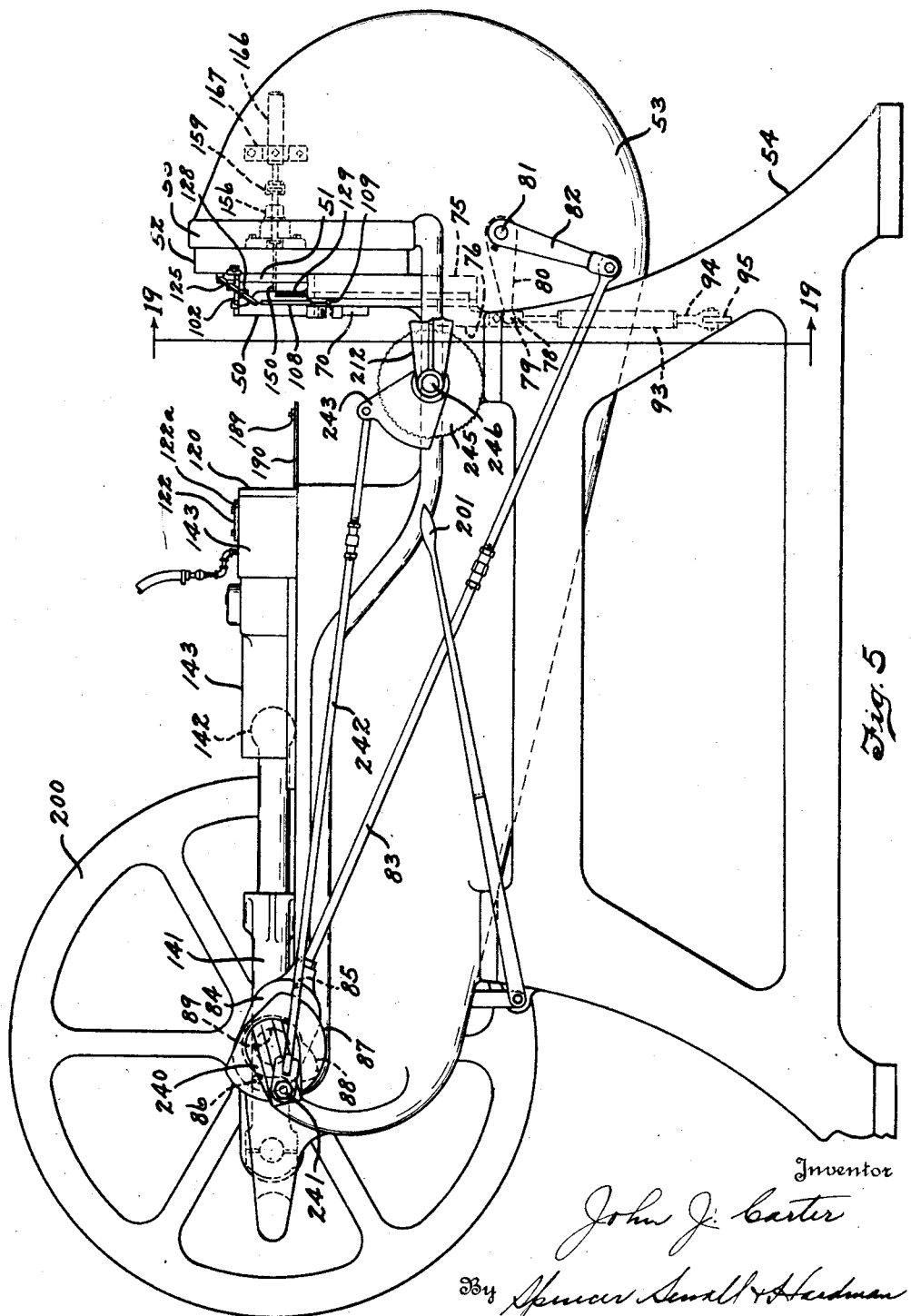

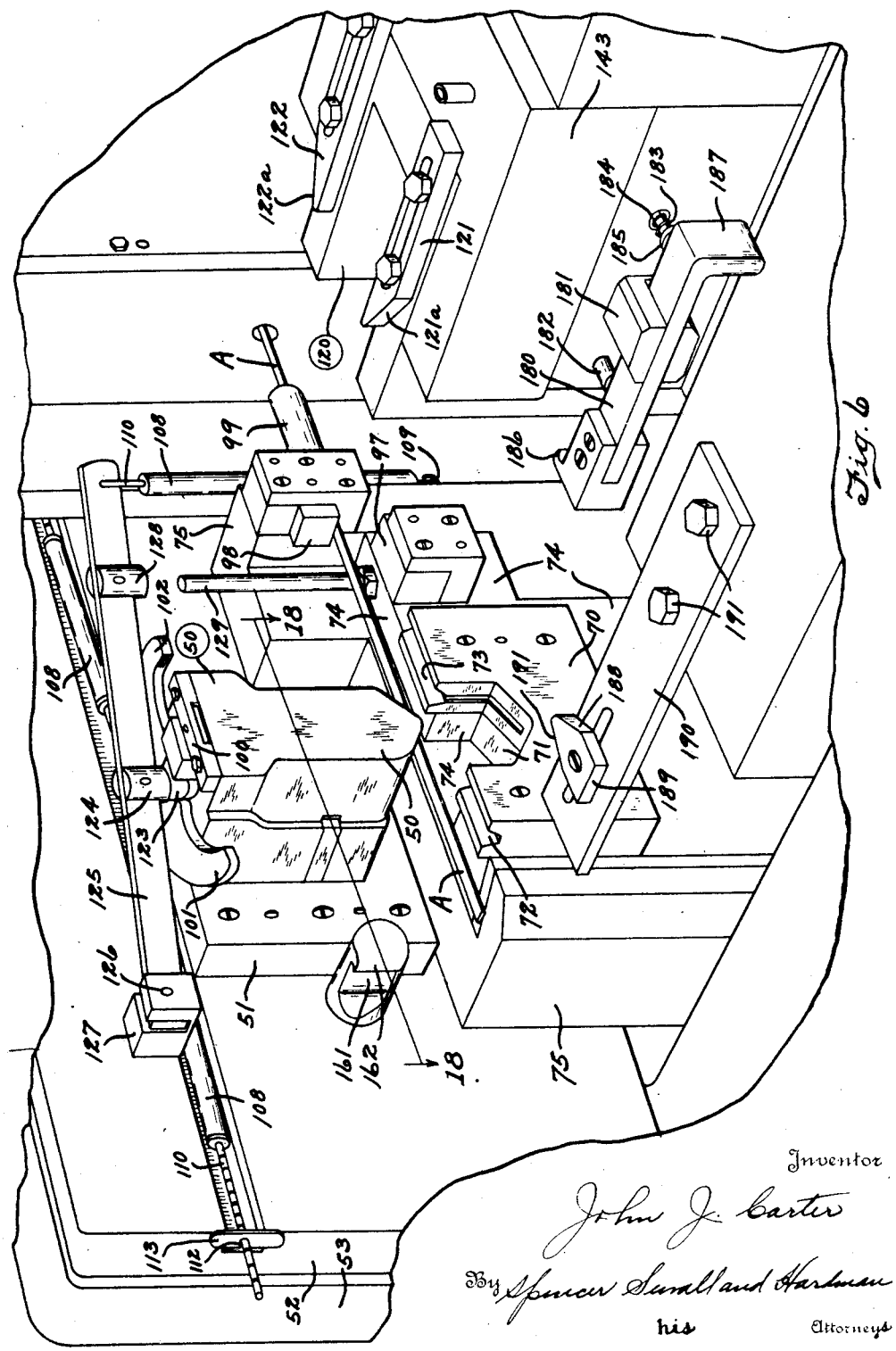

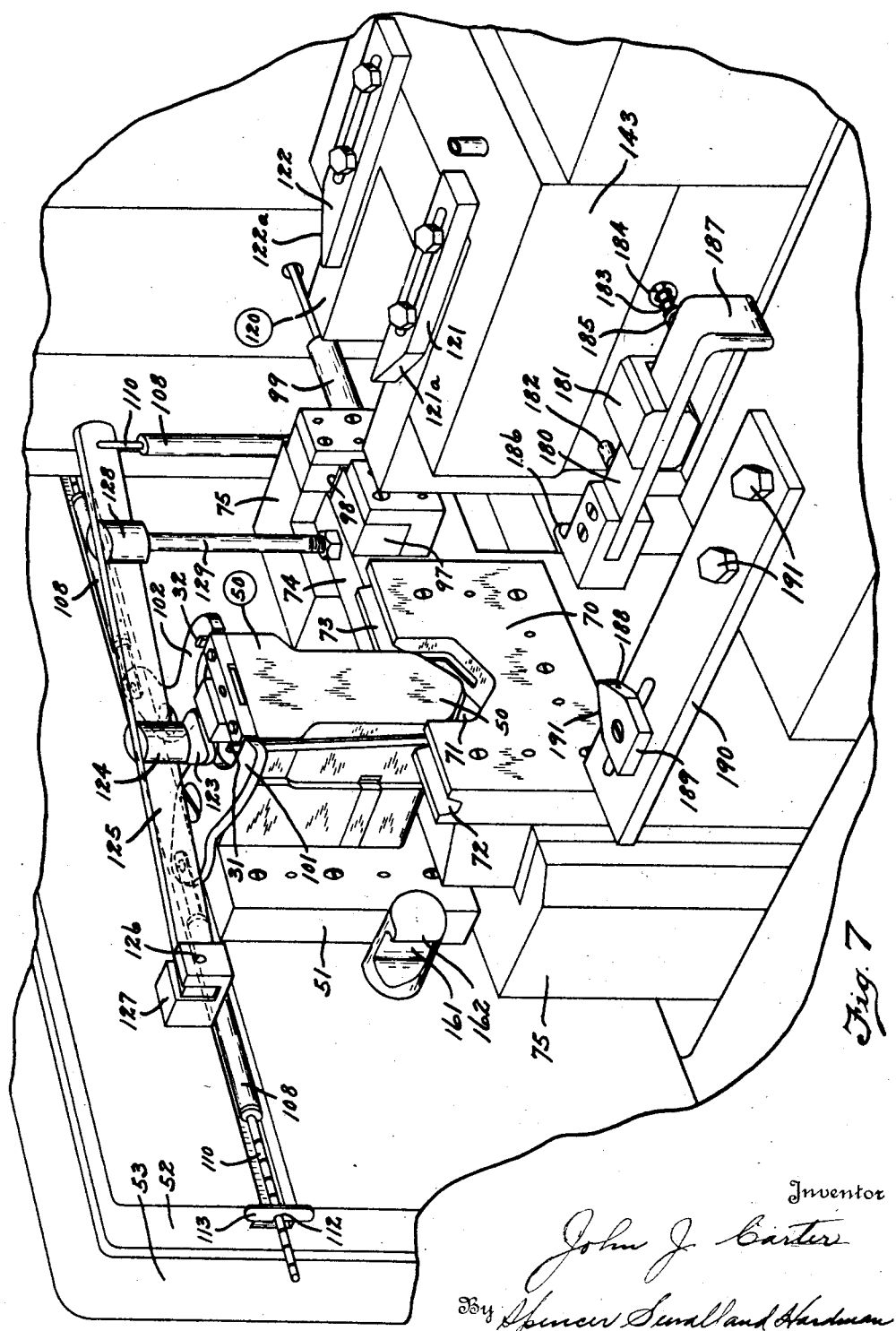

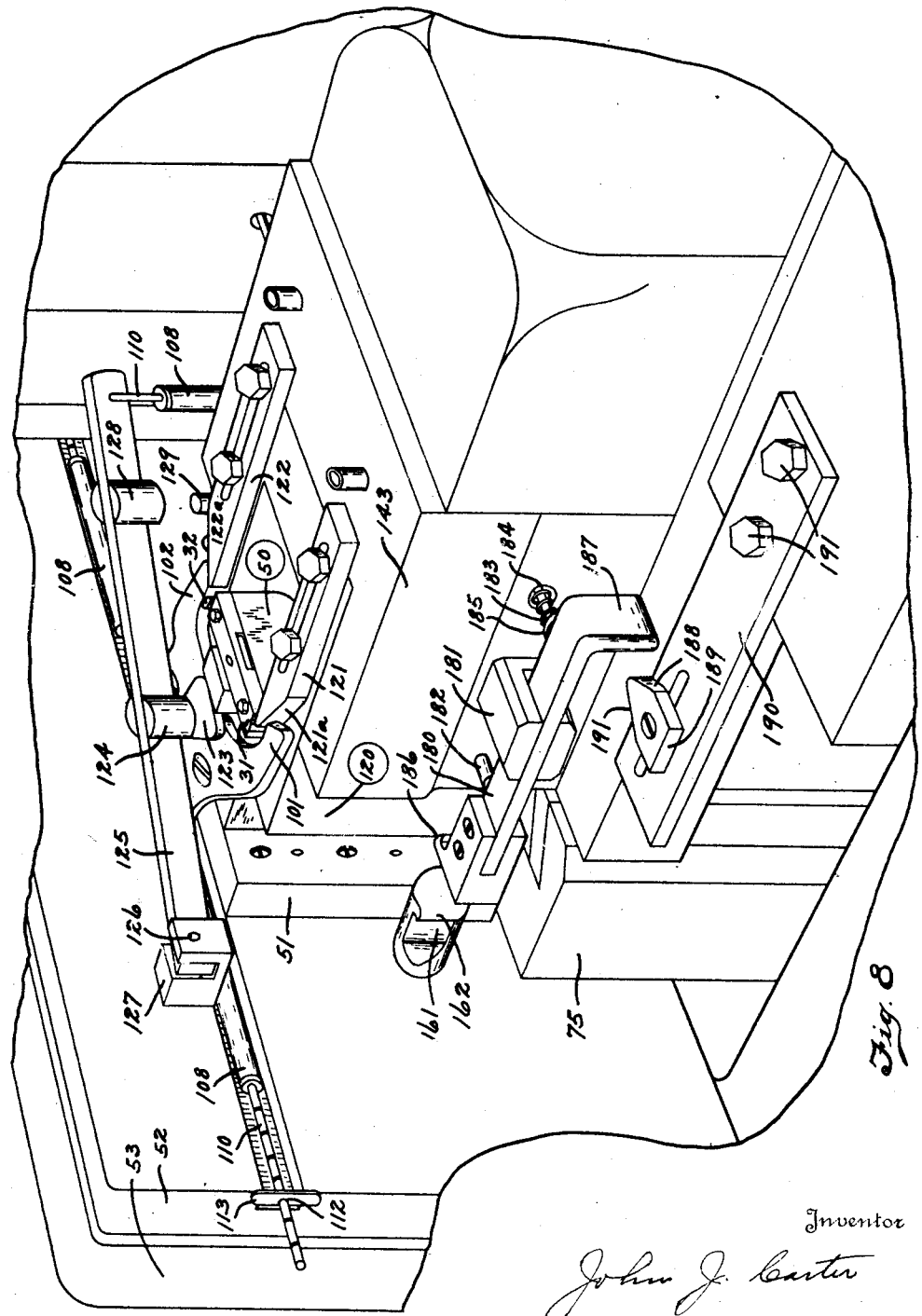

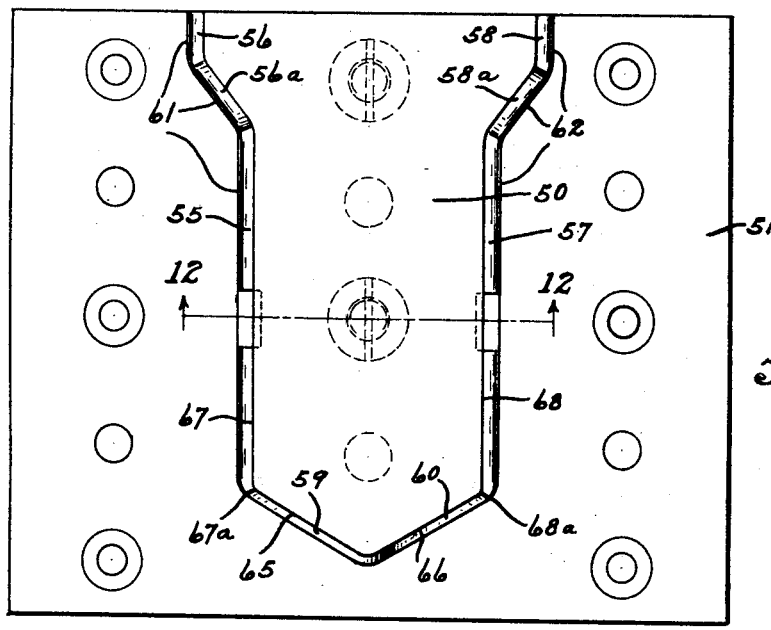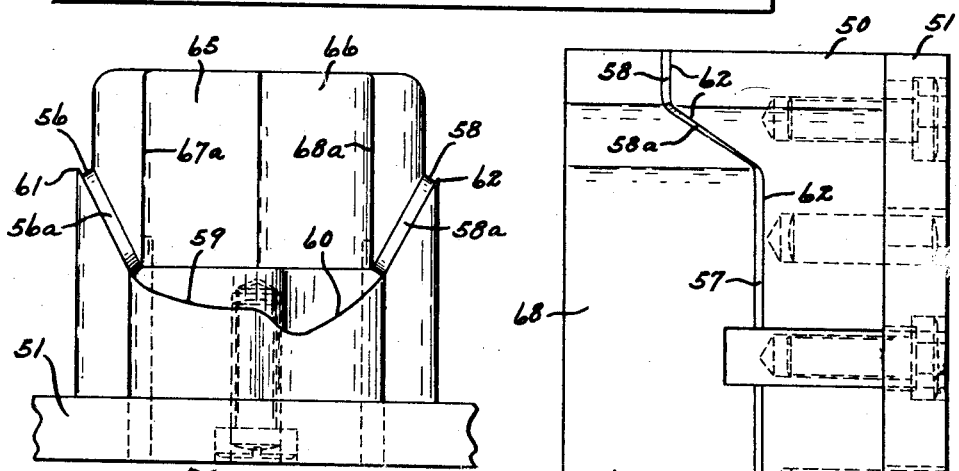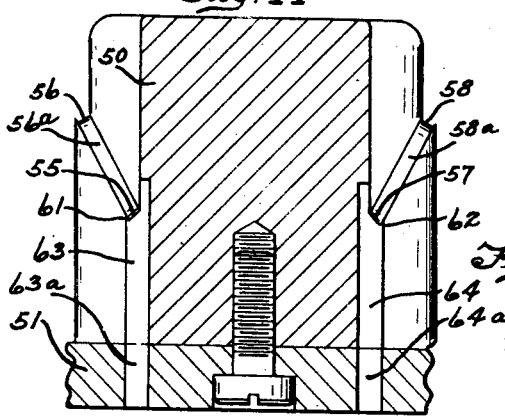

July 23, 1929.  J. J. CARTER  1,721,810

METHOD AND MEANS FOR FORMING ARMATURE CONDUCTORS

Filed Oct. 25, 1924   12 Sheets-Sheet 7

Inventor
John J. Carter
By Spencer Surall and Hardman
his Attorneys

July 23, 1929.　　　J. J. CARTER　　　1,721,810
METHOD AND MEANS FOR FORMING ARMATURE CONDUCTORS
Filed Oct. 25, 1924　　12 Sheets-Sheet 8

Inventor
John J. Carter
By Spencer Small & ... his Attorneys

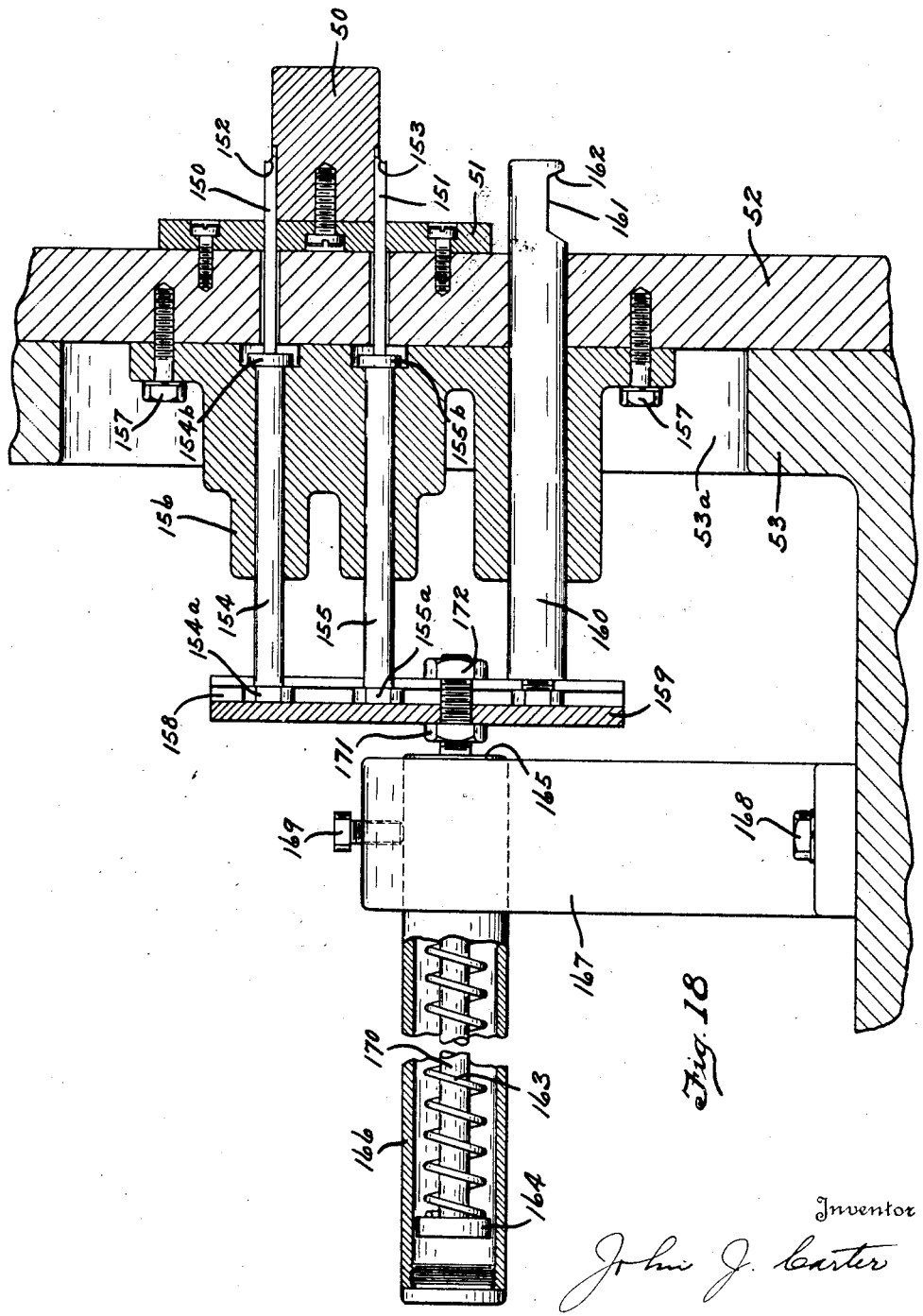

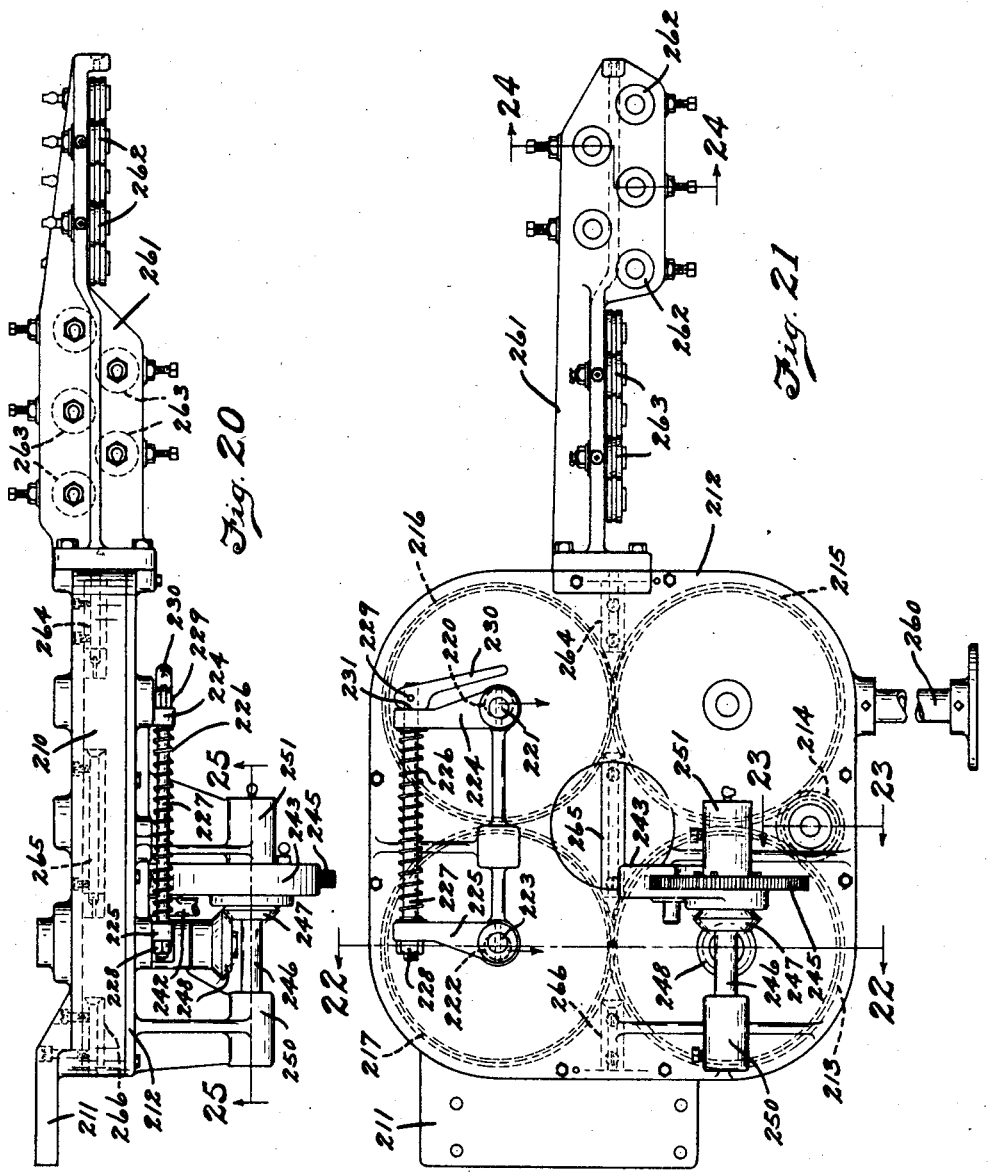

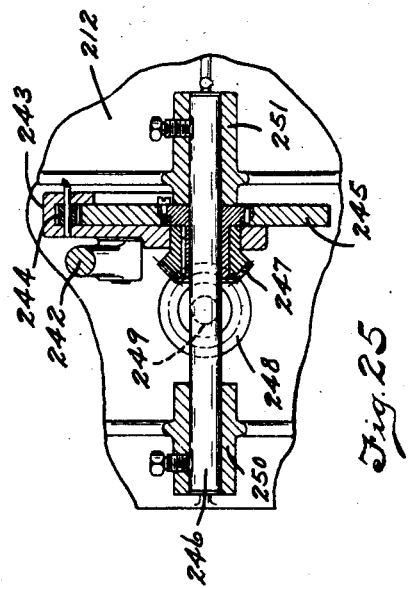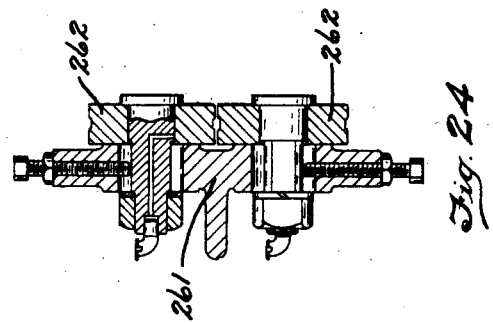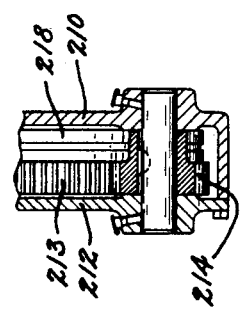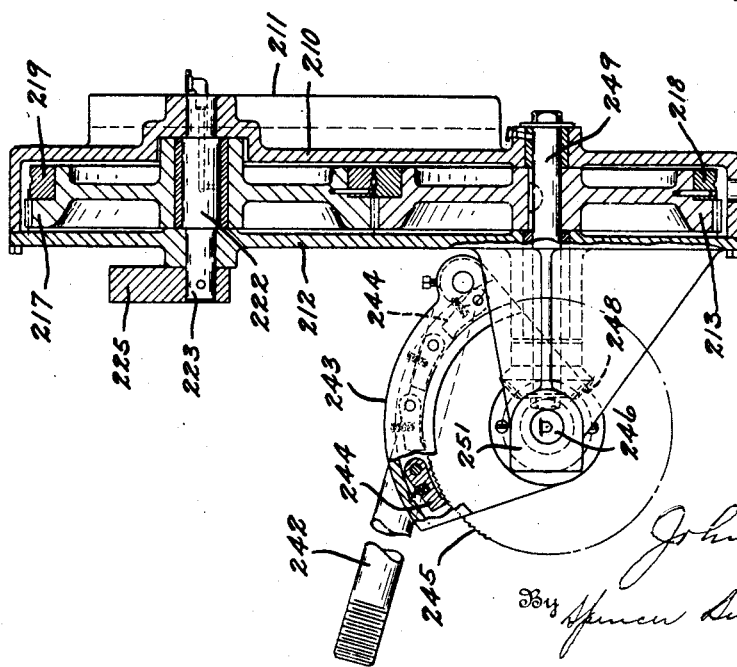

Patented July 23, 1929.

1,721,810

UNITED STATES PATENT OFFICE.

JOHN J. CARTER, OF ANDERSON, INDIANA, ASSIGNOR, BY MESNE ASSIGNMENTS, TO DELCO-REMY CORPORATION, OF DAYTON, OHIO, A CORPORATION OF DELAWARE.

METHOD AND MEANS FOR FORMING ARMATURE CONDUCTORS.

Application filed October 25, 1924. Serial No. 745,833.

This invention relates to the manufacture of armatures for dynamo electric machines and more particularly to the manufacture of single turn bar conductors for electric motors. Such conductors are commonly known as hair pin conductors.

Heretofore it has been the practice to form from a length of wire a plurality of hair pin conductors as having branches or inductor portions which are substantially parallel with each other throughout the entire length of the branch portions. These hair pins are assembled upon the armature core and then the ends of the hair pins which project beyond the core are bent or twisted so that they form armature coil leads located in radial alignment with the commutator bars with which they are to be connected. Another method of constructing motor armatures includes forming first a hair pin conductor having branches which are substantially parallel throughout the entire length and then placing the conductor thus formed between die members which offset the extremities of the branch portions from the inductor portions of the conductors in such a manner that, when the conductor is assembled upon the armature core, its ends will be in correct radial alignment with the commutator bars to which the conductor is connected.

The objects of the present invention include a process and an apparatus for forming automatically during one cycle of machine operation a hair pin conductor having parallel inductor portions and end portions which are offset from the inductor portions in such a manner that the conductor is readily adapted to be assembled upon an armature core and to be connected with the proper commutator bars.

Further objects and advantages of the present invention will be apparent from the following description, reference being had to the accompanying drawings, wherein a preferred form of embodiment of the present invention is clearly shown.

Figures 1, 2:
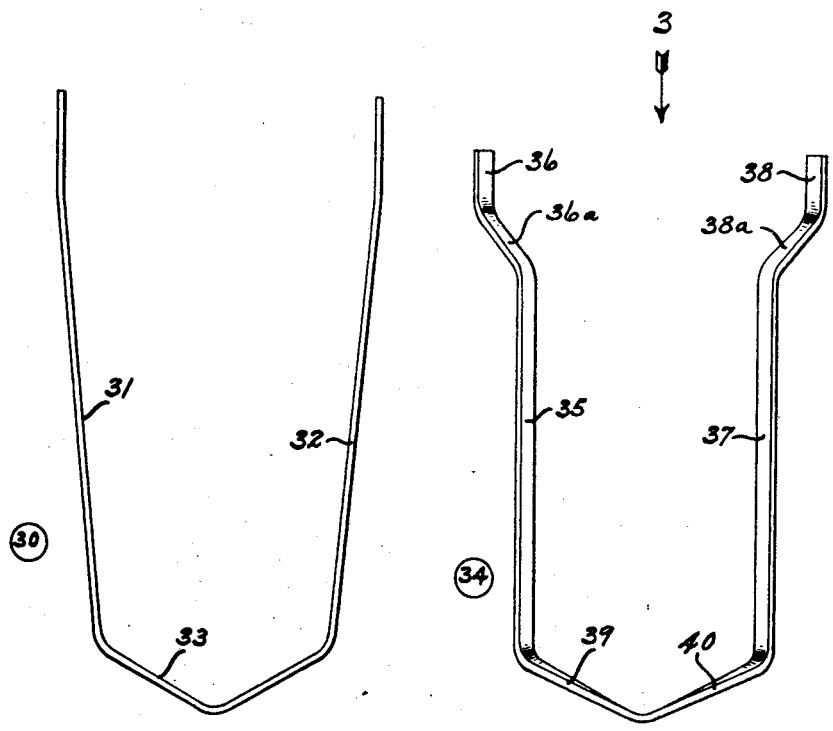
Fig. 1 shows the first step in the present method of forming a hair pin conductor.
Figs. 2 and 3 are plan and end views, respectively, of the completed hair pin conductor, Fig. 3 being taken in the direction of arrow 3 in Fig. 2.
Figures 3, 4:
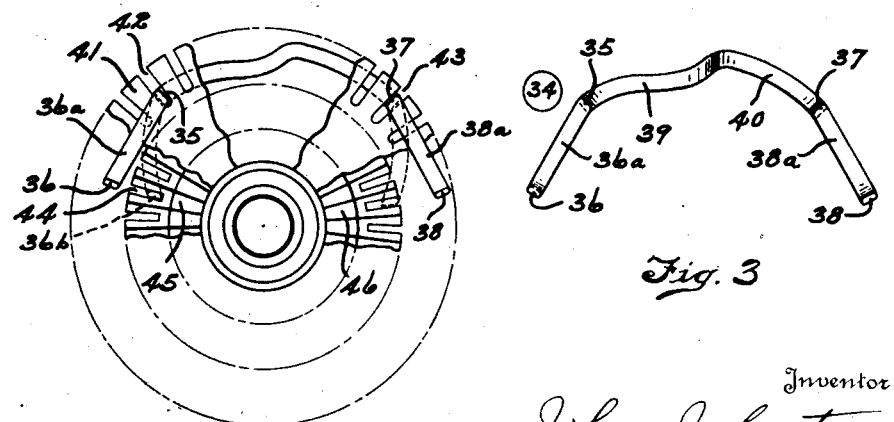
Figure 14:
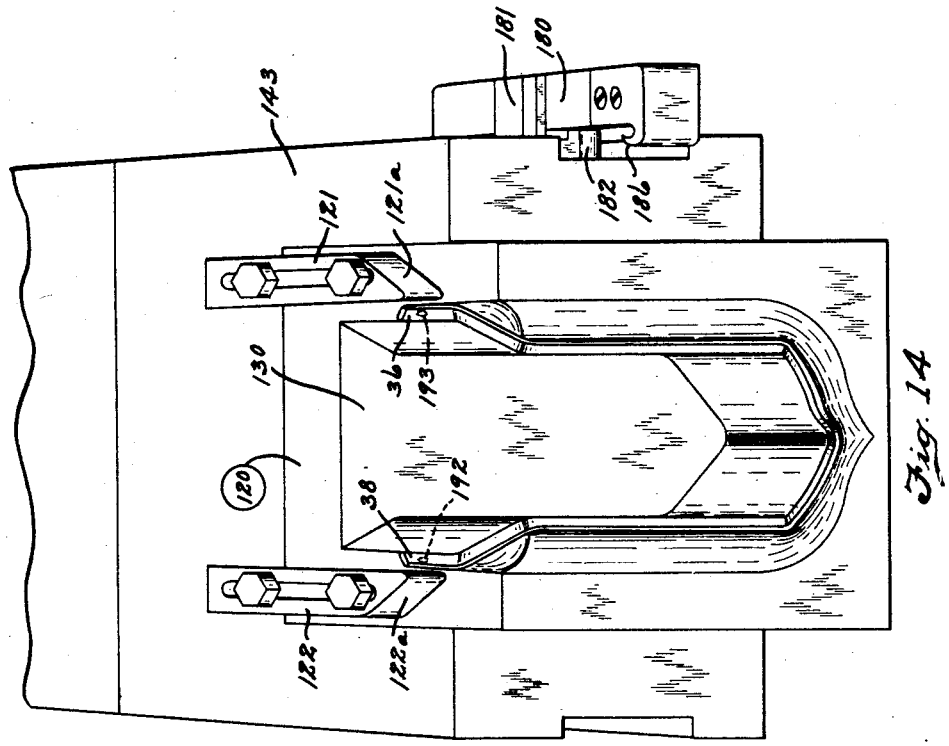
Figure 13:
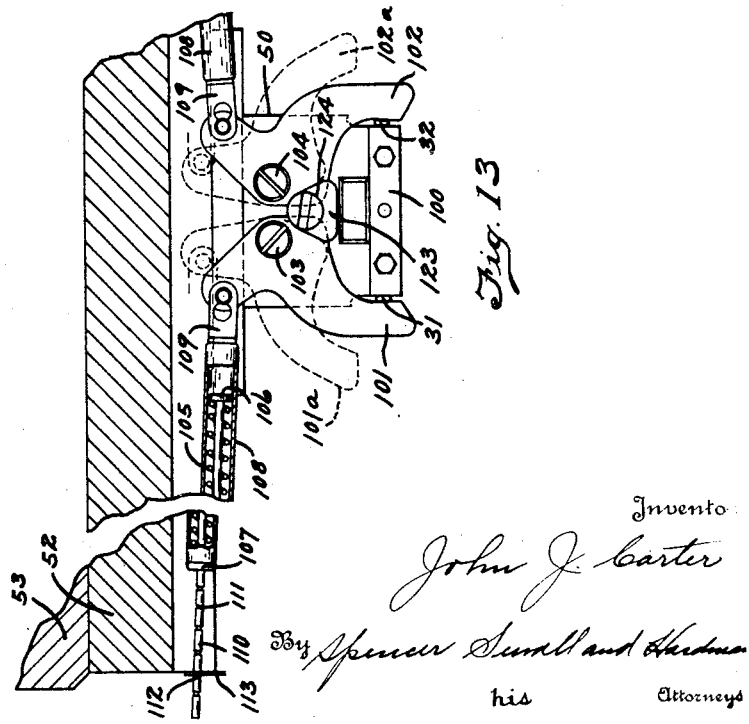
Figure 15:
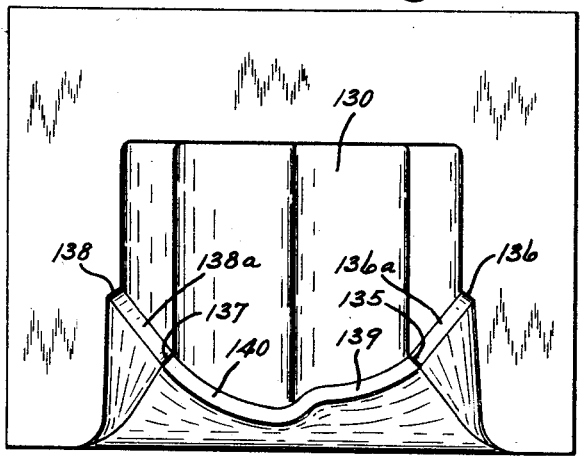
Figure 17:
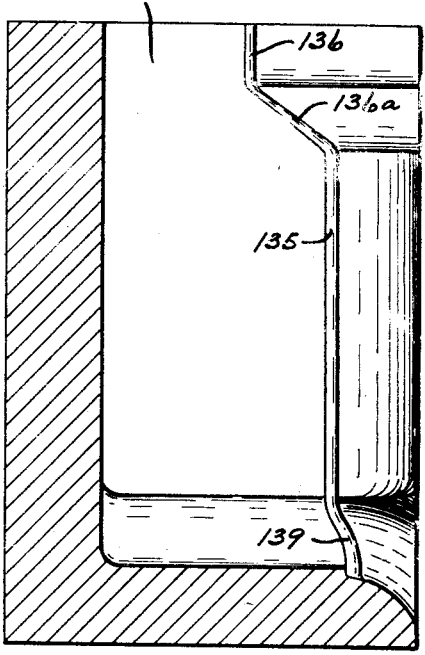
Figure 16:
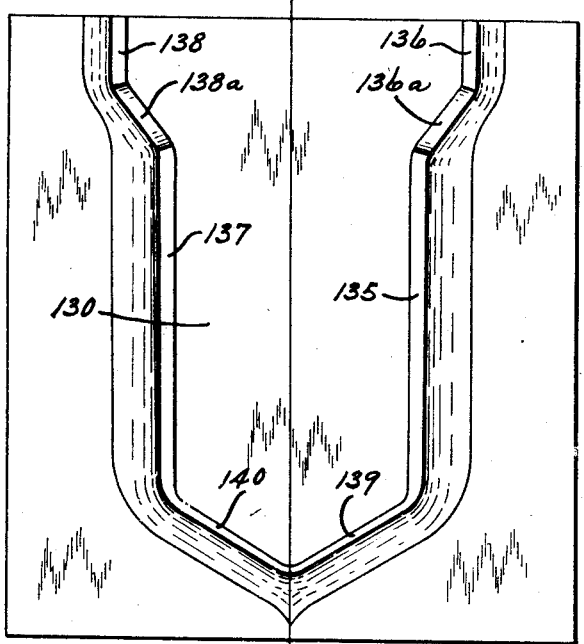
Figure 19:
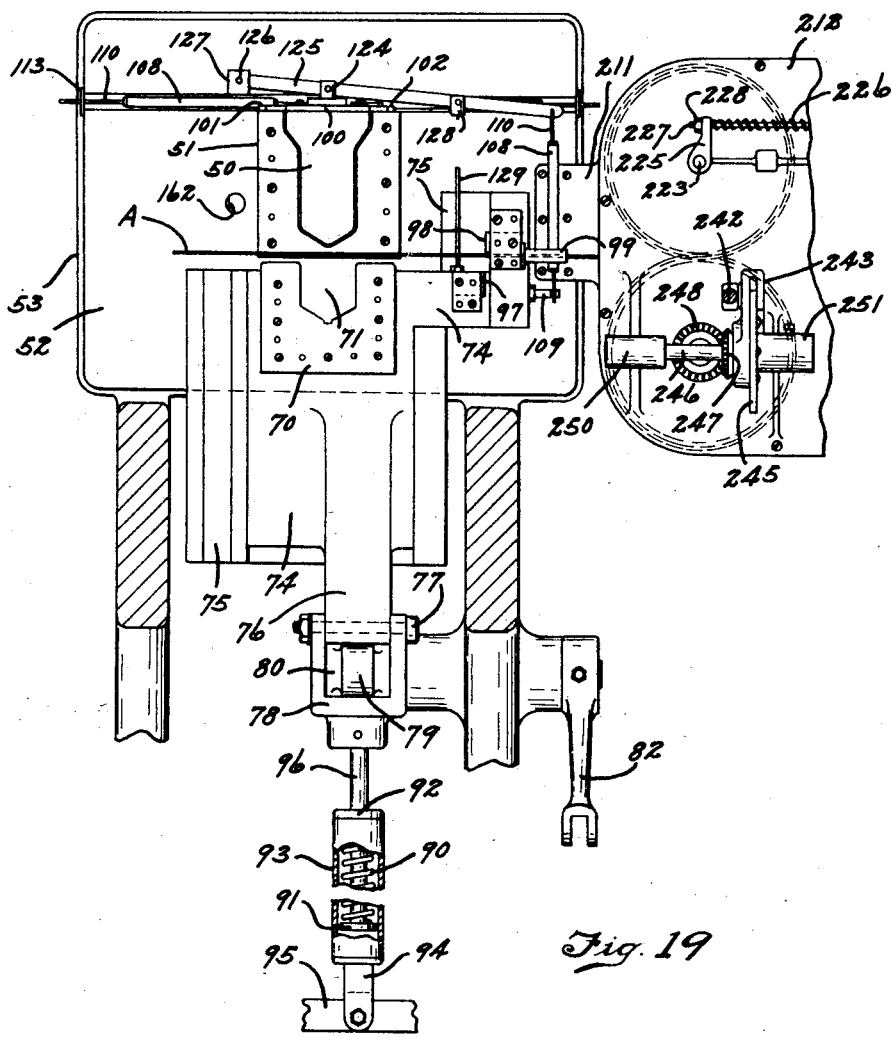

Fig. 4 includes a view similar to Fig. 3 of the hair pin and fragmentary end view of an armature core and commutator, illustrating the manner of assembling the conductor upon the core and of attaching the leads of the conductor to the commutator;

Fig. 5 is a side elevation of a machine for forming hair pin conductors according to the method shown in Figs. 1, 2 and 3;

Figs. 6, 7 and 8 are fragmentary perspective views of the machine in different conditions of operation;

Figs. 9, 10 and 11 are front, side and bottom views, respectively, of the stationary die member;

Fig. 12 is a sectional view on the line 12—12 of Fig. 9;

Fig. 13 is a fragmentary view, partly in section, showing a top view of the die member shown in Figs. 9 and 12 and also a portion of the mechanism for clamping temporarily the hair pin conductor with a stationary die member;

Fig. 14 is a front perspective view of one of the movable die members;

Figs. 15, 16 and 17 are top, front and longitudinal sectional views respectively of the die members shown in Fig. 14, Fig. 17 being taken on the line 17—17 of Fig. 16;

Fig. 18 is a fragmentary sectional view taken substantially on a horizontal plane intersecting the line 18—18 of Fig. 6;

Fig. 19 is a fragmentary view, partly in section, the view being taken on the line 19—19 of Fig. 5;

Figs. 20 and 21 are top and front views respectively of the wire straightening and feeding mechanism used with the machine shown in the preceding views;

Figs. 22, 23 and 24 are sectional views taken respectively on the lines 22—22, 23—23 and 24—24 of Fig. 21; and Fig. 25 is a sectional view on the line 25—25 of Fig 20.

Referring to the Figs. 1 to 4 inclusive, the method included in the present invention consists in forming from a length of wire rectangular in section an open loop or hair pin conductor 30 shown in Fig. 1 having branch portions 31 and 32 joined by a V-shaped yoke 33. The branches and yoke will occupy the same plane. The conductor shown in Fig. 1 is formed between die members into the conductor 34 shown in Figs. 2 and 3. Branch 31 has been formed into an inductor portion 35 and an offset portion 36 or lead, parallel to portion 35 which is adapted to be attached to a commutator bar which is angularly displaced from the core slot which receives the inductor portion 35. The branch 32 has been formed into an inductor 37 and an offset lead portion 38. The V-shaped yoke 33 has been formed into portions 39 and 40 which are substantially arcuate as viewed in Fig. 3.

During the first bending step, the result of which is shown in Fig. 1, the intermediate portion of the strip of wire is bent in one plane to produce approximately the desired configuration of the hairpin yoke as it appears in the plan view of the conductor. During the second step in the bending method, resulting in the shape shown in Figs. 2 and 3, this intermediate portion is bent transversely to the first mentioned plane of bending in order to produce the desired configuration of the hairpin yoke as it appears in the end view of the conductor. It will be noted that the yoke has been bent in such manner that the hairpin branches 35 and 37, which extend respectively from the yoke portions 39 and 40, are so located that the flat sides of the branch portions lie in intersecting planes, the intersection of which is more remotely spaced from the branch 37 than from the branch 35; therefore when the hairpin conductor is assembled with the armature core as shown in Fig. 4, the yoke portions 39 and 40 will lie substantially concentric to the periphery of the core as viewed in Fig. 4 and the branch portion 35 will occupy part of a core slot nearer to the axis of the core than a portion of the core slot occupied by the branch portion 37. In this way the present method provides for forming a single turn or hairpin conductor adapted to be assembled with others upon an armature core so that each core slot will be occupied by active coil sides of two different armature conductors.

Referring to Fig. 4, the conductor 34 is assembled upon an armature core 41, the branches 35 and 37 occupying slots 42 and 43 respectively. As shown in Fig. 4 the inductor 35 will occupy the bottom portion of the slot 42 and inductor 37 will occupy the outer portion of the slot 43. The lead 36 is located adjacent the slot 44 in the riser commutator bar 45 and is moved into the position 36$^b$ indicated in dotted lines in Fig. 4 by bending the portion 36$^a$ of the hair pin 34 which connects the inductor portion 35 with the lead 36. The lead 38 is connected in like manner with the slotted riser portion of the commutator bar 46.

A machine for carrying out the method shown in Figs. 1 to 3 consists chiefly of means for forming a hair pin conductor having its branch and yoke portions occupying the same plane, and means for forming such a conductor into a single turn bar winding or hair pin conductor having parallel inductor portions, each provided with a portion offset therefrom and adapted to be connected with a commutator bar. In other words, the machine performs two forming operations upon a piece of wire during each cycle of movement.

Referring to Figs. 5 to 8, the mechanism for performing the first operation illustrated in Fig. 1 includes a stationary die member 50 and parts associated therewith and a movable die member 70 which is operated by a power driven mechanism. The means for performing the second operation illustrated in Figs. 2 and 3 includes the stationary die member 50 and a second movable die member 120 also actuated by power driven mechanism.

The stationary die member 50 is attached to a supporting block 51 also attached to the vertically arranged bed 52 of a horizontal punch press frame 53 mounted on a stand 54. The die 50 is provided with forming surfaces 55 and 57 for forming respectively the inductor portions 35 and 37 and with surfaces 56 and 56$^a$ for forming the lead portions 36 and 36$^a$ shown in Fig. 2 and with portions 58 and 58$^a$ for forming the lead portions 38 and 38$^a$. The die member 50 includes surfaces 59 and 60 for receiving and forming the yoke portions 39 and 40 shown in Figs. 2 and 3. The portions 56, 56$^a$ and 55 and the portions 58, 58$^a$ and 57 are bordered by continuous ledges 61 and 62, respectively, to assist in preventing displacement of the material of the conductor during the forming operation. The die 50 and base 51 are provided with aligned orifices 63 and 63$^a$ and aligned orifices 64 and 64$^a$ for the purpose of receiving ejector members to be described later. The die 50 is provided with downwardly converging plane surfaces 65 and 66 which merge into parallel plane portions 67 and 68 at the corners 67$^a$ and 68$^a$ respectively.

Referring to the Figs. 6 and 19 the die member 70 is provided with a notch 71 for receiving the lower portion of die 50 and for causing the wire stock A to be received between the die members 50 and 70 and for causing a strip of wire to be bent around the surfaces 65 and 66 and the corners 67$^a$ and 68$^a$ of the die 50. The die 70 is provided with notches 72 and 73 for receiving the wire A during the upward movement of the die 70 toward the die 50.

The mechanism for actuating the die 70 is shown more clearly in Figs. 5 and 19 and includes a slide 74 supported for vertical sliding movement by a bracket 75 attached to the block 51. Slide 74 is provided with a handle 76 attached by a pin 77 to a U-shaped clevis 78. The end 79 of a lever 80 is included between the clevis 78 and the handle 76 and is attached to a shaft 81 carrying arm 82 which is attached by a link 83 to a cam follower plate 84. Plate 84 carries cam rollers 85 and 86 cooperating respectively with cams 87 and 88 which are attached to the main drive shaft 89. Rotation of the cam 88 will cause the link 83 to move to the left in Fig. 5 and the slide 74 and die 70 to move upwardly. Return movement of the die 70 is produced by the operation of the cam 87 upon follower 85, and this return movement is assisted by a spring 90 which is maintained in a state of compression between a flange 91 and the perforated end 92 of a tubular spring case 93. The case 93 is attached by a strap 94 to a cross bar 95 carried by the stand 54. The flange 91 is attached to the lower end of a rod 96, the upper end being attached to the clevis 78.

The slide 74 carries the movable shear block 97 cooperating with a stationary shear block 98 carried by the bracket 75. The block 75 carries a tube 99 for guiding the wire A between the shear members 97 and 98, from the feeding device to be described.

The mechanism for temporarily clamping the branches of the hair pin shown in Fig. 1, against the sides of the block 50 as shown in Fig. 7, comprises a stationary clamping member 100 attached to the block 50 having its ends disposed in the plane of clamping levers 101 and 102 shown in plan view in Fig. 13. The levers are pivoted upon screws 103 and 104, respectively, attached to the block 50. Lever 101 is maintained in clamping position, as shown in Figs. 13 and 7, by means which include a spring 105 located between a flange 106, and the perforated end 107 of a spring tube 108. The tube 108 is connected by clip 109 with the arm 101. The flange 106 is connected with a rod 110 having a plurality of grooves 111 adapted to be received by a U-shaped notch 112 of a bracket 113 attached to the bed 52. Which of the grooves 111 is received by the bracket 113 determines the compression of the spring 105, and hence, the regulation of the clamping pressure at the parts 101 and 31. The branch 32 of the conductor as shown in Fig. 1 is clamped as shown in Fig. 13 between the block 100 and the clamping arm 102 and is maintained by a spring device like the one which cooperates with the lever 101.

In order to form the ends of the conductor shown in Fig. 2, means are provided for moving the arms 101 and 102 into a non-clamping position as shown in Fig. 6 and for holding them in this position until the operation shown in Fig. 7 is performed. The device for moving these arms into non-clamping position includes two blocks 121 and 122 adjustably secured to the die member 120 and having camming surfaces 121$^a$ and 122$^a$ adapted to engage respectively the arms 102 and 101 in order to move them from the position shown in Fig. 7 to the position shown in Fig. 6. This movement of the arms 101 and 102 causes a substantially triangular shaped separator or wedge 123 to drop between the arms 101 and 102 when they are in the position 101$^a$ and 102$^a$ indicated in dotted lines in Fig. 13. The separator or wedge 123 is mounted on the lower end of the bracket 124 which is pivotally supported by a bar 125 pivotally attached at 126 to a block 127 carried by the bed 52. The bar 125 is yieldingly urged toward the die 50 by a spring device which includes members 108, 109 and 110 constructed similarly to parts similarly numbered in Fig. 13. The part 109 is secured to the stationary guide block 75. The bar 125 carries a block 128 adapted to be engaged by post 129 carried by the slide 74. Therefore it is apparent that upward movement of the slide 74 from the position shown in Fig. 6 to the position shown in Fig. 7 will cause the post 129 to engage the block 128 thereby moving bar 125 from the position shown in Fig. 6 to the position shown in Fig. 7. This movement causes the separator 123 to move away from the plane of arms 121 and 122, and the springs 105 to be released and to return the arms 101 and 102 to the positions shown in full lines in Fig. 13. Therefore it is apparent that the movement of the slide 74 from the position shown in Fig. 6 to the position shown in Fig. 7 causes a portion of the wire stock A to be severed by the shear blocks 97 and 98, causes this severed portion to be received by the grooves 72 and 73, and causes it finally to be bent around the lower surfaces 67$^a$, 65, 66 and 68$^a$ of the die member 50 as shown in Fig. 7. As the branches 31 and 32 are moved against the block 50 the arms 101 and 102 are released by the separator and move toward the block 50 to clamp the conductor branches 31 and 32 as shown in Fig. 13.

As the final operation upon the work as shown in Figs. 3 and 2 is performed by the cooperation of die members 50 and 120, the die member 120 is provided with a recess 130 for receiving the die 50 and is provided with surfaces 136, 136$^a$, 135, 139, 140, 137, 138$^a$ and 138 which cooperate, respectively, with the surfaces 56, 56$^a$, 55, 59, 60, 57, 58$^a$ and 58 of die 50 in order to form conductor portions 36, 36$^a$, 35, 39, 40, 37, 38$^a$ and 38 respectively.

The die 120 is actuated by the shaft 89 having a crank not shown connected with a link 141 having a ball and socket connection at 142 with a horizontally sliding block 143 to which the die 120 is detachably secured.

In order that the hair pin conductor 34 will automatically fall out of the machine after it has been completed, means are provided for transferring the hair pin 34 from the die 50 to the die 120 from which the hair pin 34 is ejected by a jet of compressed air. This transferring device includes two ejectors 150 and 151 which are provided at their outer ends with surfaces 152 and 153 which receive the work and therefore conform with the surfaces 57 and 55, respectively, of the die 50. The ejector 150 is received by the aligned holes 64 and 64ᵃ shown in Fig. 12, and ejector 151 is received by the holes 63 and 63ᵃ. The ejectors 150 and 151 extend from rods 154 and 155 supported by a bracket 156 attached by screws 157 to the bed 52. The punch press frame 53 is provided with an opening 53ᵃ for receiving the bracket 156. The rods 154 and 155 are provided with rectangular heads 154ᵃ and 155ᵃ which are received by the T-slot 158 of a bar 159 which is attached in similar fashion to a rod 160 which is slidably supported by the bracket 156, extends through the bracket 156 and is provided with a notch 161 defining a projection 162. The rods 154, 155 and 160 are maintained normally in position shown in Fig. 18 by means which includes a spring 163 confined between a flange 164 and the perforated end 165 of a spring tube 166 supported by a bracket 167 which is attached by screw 168 to the machine frame 53. The tube 166 is secured in various positions of adjustment by a set screw 169. Flange 164 is attached by a rod 170 to the bar 159, and bar 159 is secured in various positions of adjustment longitudinally of the rod 170 by adjusting nuts 171 and 172. Motion of ejectors 150 and 151 to the left in Fig. 18 by virtue of the action of the spring 163 is limited by stop flanges 154ᵇ and 155ᵇ striking the ends of the recess provided in the bracket 156 for these flanges.

Motion of the ejectors 150 and 151 toward the right in Fig. 18 or in Figs. 6, 7 and 8 in order to transfer the work from the die 50 to the die 120 occurs when the die 120 recedes to the right from the block 50. The device for producing this latter motion of ejectors 150 and 151 includes a lever 180 pivoted upon a block 181 attached to the slide 143. The lever 180 is maintained against a stop pin 182 by a spring 183 which bottoms in a recess 184 in slide 143 and presses a plunger 185 against the lever 180. Lever 180 includes a hook member 186 adapted to be received by the recess 161 of rod 160 and to engage projection 162. Fig. 8 of the drawings shows the die 120 in a certain position during its movement toward the die 50. During this movement an extension 187 of lever 180 strikes the camming surface 188 of a block 189 which is adjustably secured to the bar 190 attached by screws 191 to the machine frame. The cooperation of parts 187 and 188 causes the hook portion 186 to be moved away from the slide 143 so that the hook 186 will move free of the projection 162. At the end of the movement of lever 180 toward the left the projection 187 will be free of the block 189 so that the spring 183 will cause the hook 186 to move into the notch 161. Consequently, movement of the slide 143 to the right will cause the hook 186 to engage the projection 162 and cause the ejectors 150 and 151 to move to the right as viewed in Fig. 18. During motion of the slide 143 to the right the extension 187 of lever 180 strikes the camming surface 191 of block 189 and causes the hook to move again away from the slide 143. Therefore the hook will be disconnected from the projection 162, by the time the ejectors 150 and 151 have moved sufficiently to transfer the work into or upon the die 120. As soon as the projection 162 is released from the hook 186 the spring 163 will return the ejectors 150 and 151 to normal position. After the work has been transferred in this manner it will be located upon the die 120 as shown in Fig. 14. By suitable automatic device, not shown, jets of compressed air are caused to issue from the small holes 192 and 193 provided by the die 120 after the die 120 is free of the die 50. The work will be caused to fall out of a die 120 into a suitable receptacle or chute not shown.

A flywheel pulley 200, loosely mounted upon the shaft 89 and driven by a suitable motor, is drivingly connected with the shaft 89 by a suitable clutch mechanism, not shown, which is operated by a lever 201.

The mechanism for feeding wire stock from supply reel to the machine includes a frame 210 provided with a flange 211 attached to the bed 52 and provided with a cover 212 which cooperates with the frame and is provided with a train of gears 213, 214, 215 and 216, and a gear 217 which is driven by the gear 213. Gears 213 and 217 are provided with groove rings 218 and 219 respectively and gears 215 and 216 are each provided with a similar ring for receiving the wire stock and feeding it toward the left as viewed in Fig. 21. The gears 213 and 215 are mounted on shafts which are fixed as regards lateral displacement, and the gears 217 and 216 are adjustable toward the gears 213 and 215 respectively by mounting them upon shaft portions which are laterally displaceable. For example, the gear 216 is mounted upon a shaft portion 220 having journals 221 which are eccentric with respect to the portion which receives the hub of the gear 216. The gear 217 is similarly mounted upon a shaft 222 having an eccentric journal portion 223. The journals 221 and 223 extend beyond the cover plate 212 and are attached respectively to levers 224 and 225 which are normally urged apart by a spring 226 which surrounds a rod 227 passing through a somewhat larger hole in the end of levers 225 and receiving a nut 228. The opposite end of rod 227 passes through a somewhat larger hole in lever 224 and carries a pin 229 pivotally supporting a lever 230 having a camming surface 231 for providing a stop to limit separation of levers 224 and 225. When it is desired to separate gears 217 and 216 from gears 213 and 215, respectively, lever 230 is turned counterclockwise thereby causing the upper ends of levers 224 and 225 to approach each other. This action causes the centers of the shaft portions 220 and 222 to be elevated.

The feeding mechanism is driven from the shaft 89 by means of a crank 240 adjustably supporting a crank pin 241 connected by link 242 with a ratchet pawl lever 243. Lever 243 carries a plurality of pawls 244 which are spring pressed toward a ratchet 245 loosely mounted on shaft 246. Ratchet 245 is attached to a bevel gear 247 meshing with a beveled gear 248 carried by the shaft 249 which drives the gear 213. Shaft 246 is supported by brackets 250 and 251 carried by the cover 212.

The frame 210 is supported also by a pedestal 260 and carries a straightening roll frame 261 supporting a set of vertically arranged straightening rolls 262 and a set of horizontal rolls 263. These rolls are adjustable as indicated in Fig. 24 in order to adapt the machine to various sizes of wire.

The frame 210 carries a plurality of guides 264, 265 and 266 which are detachably secured so that they may be replaced by guides of different internal dimensions. It is apparent that the operation of the machine will cause the gears 213 and 215 to move counterclockwise so that the stock A will be fed to the left as viewed in Fig. 19 through the tube 99 and between the shear blocks 97 and 98. By varying the throw of the crank pin 241 the length of wire fed through the machine may be varied. The shear blocks 97 and 98 are also adjustable in their holders with respect to the distance horizontally from the center of the die 50. By varying the length of feed and by varying the distance of the shear blocks from the center of the die 50 the machine may be adapted for producing hair pin conductors of different dimensions of the type shown in Figs. 2 and 3.

I claim:

1. The method of forming a single-turn armature conductor which consists in bending a strip of wire into an open loop having a yoke portion and branch portions in substantially the same plane, and then forming the branch portions into parallel inductor portions each joined with a lead portion offset from but parallel with the inductor portion.

2. Apparatus for making armature conductors comprising, in combination, means for forming a strip of wire into an open loop having its branch and yoke portions in substantially the same plane; and means for forming the yoke into offset portions and for forming the branch portions into parallel inductor portions each joined with a lead portion parallel to the respective branch portion but offset therefrom.

3. Apparatus for making armature conductors comprising, in combination, means for forming a strip of flat-sided wire into an open loop having its flat branch and yoke portions in substantially the same plane; and means for forming offset portions in the yoke which diverge from one another toward the branches of the loop, and which throw the branches into oblique planes, the intersection of which is spaced more remotely from the one branch than from the other.

4. Apparatus for making armature conductors comprising, in combination, means for forming a strip of wire into an open loop having its branch and yoke portions in substantially the same plane; and means for forming the yoke into offset, concentric portions diverging from one another toward the branches of the loop, and for forming the branches into parallel inductor portions, each joined with a lead parallel to the respective branch portion but offset therefrom.

5. Apparatus for forming a strip of wire of oblong cross section into a single-turned armature conductor, which includes, in combination, a stationary die and a movable die having cooperating surfaces for engaging the strip and bending it around the stationary die to form a loop having branch and yoke portions in substantially the same plane; and a second die movable transversely to the first movable die, the stationary die and said second movable die having companion-cooperating surfaces for bending the yoke only about axes transverse to the axes of bending by the first movable die to form the said yoke portion into members offset from one another and diverging toward the branches as they appear in the end view of the conductor and for forming the branches into parallel inductor portions, their adjacent sides being located in planes making an angle with one another.

6. Apparatus for forming a strip of wire of oblong cross section into a single-turn armature conductor, which includes, in combination, a stationary die and a movable die having cooperating surfaces for engaging the strip and bending it around the stationary die to form a loop having branch and yoke portions in substantially the same plane and the longer sides of the branches in substantially parallel planes; and a second die movable transversely to the first movable die, the stationary die and said second movable die having companion-cooperating surfaces for bending the yoke only about axes transverse to the axes of bending by the first movable die to form the said yoke portion into members offset from one another and diverging toward the branches as they appear in the end view of the conductor to move the branch portions into intersecting planes and at different distances from the intersection of said planes, and for forming the branches into parallel inductor portions, each inductor portion being connected with a lead portion offset from the inductor portion.

7. Apparatus for making armature conductors comprising, in combination, male and female die members having cooperating surfaces for forming between them a single turn open-loop conductor; means for producing movement of one of the die members relative to the other in one direction for forming said conductor and in a reverse direction after the said conductor is formed; and means controlled by the reverse movement of said movable die member for causing the conductor to remain on and move with said movable die member whereby said conductor will be transported to a proper place of ejectment by said movable die member.

8. Apparatus for making armature conductors comprising, in combination, male and female die members having cooperating surfaces for forming between them a single turn open-loop conductor; means for moving the female die relative to the male die to form said conductor and to separate the dies after the conductor is formed; means for causing the conductor to move with the female die when it separates from the male die, whereby said conductor is transported to the proper place of ejectment; and means for ejecting the conductor from the female die.

9. Apparatus for making armature conductors comprising, in combination, a stationary die member; a movable die member having a normal inoperative position; means for moving the movable die member toward the stationary die member to form a conductor and for moving the said movable die member away from the stationary die member into its normal inoperative position after the conductor has been formed; means for moving the conductor from the stationary die member and causing it to remain in the movable die member as said member is moved to its normal inoperative position; and means for ejecting said conductor from the movable die member when it reaches its normal inoperative position.

10. Apparatus for making armature conductors comprising, in combination, male and female die members having cooperating surfaces for forming between them a single turn open-loop conductor, means for producing movement of one of said die members toward the other; a normally open clamp supported on the stationary die member; and means controlled by the operation of the movable die member to close the clamp and cause it to hold the conductor on the stationary die member when said movable die member has reached a proper point in its movement toward the stationary die member.

11. Apparatus for making armature conductors comprising, in combination, male and female die members having cooperating surfaces for forming between them a single turn open-loop conductor, means for producing movement of one of said die members toward the other; a clamp including jaws adapted to engage the stationary die member; a wedge for holding said jaws in non-clamping position; and means controlled by the operation of the movable die member to remove the wedge and permit the clamp-jaws to move toward the stationary die member when the movement of the movable die member has completed the forming operation, whereby the conductor will be clamped to the stationary die member.

12. Apparatus for forming a strip of wire into armature conductors comprising in combination, a male die member having a plurality of forming surfaces; a female die member having a surface adapted to cooperate with one of the male die forming surfaces to give the wire strip one conformation; means for moving said female die member relative to the male die member to complete said one conformation; means controlled by the said movement of the female die member for clamping the formed strip of wire on the male die member; means for separating the female and the male die members; a second die member having a surface adapted to cooperate with the other forming surface of the male die member to give the wire strip, now in the form of a loop, another conformation; means for moving the second female die member transversely to the movement of the first female die member and into cooperative engagement with the male die member; and means carried by said second female die member for releasing the clamping means when the second female die member has properly engaged the male die member.

13. Apparatus for forming a strip of wire into armature conductors comprising in combination, a male die member having a plurality of forming surfaces; a female die member having a surface adapted to cooperate with one of the male die forming surfaces to give the wire strip one conformation; means for moving said female die member relative to the male die member to complete said one conformation; a clamp including jaws adapted to move into engagement with the male die member; a wedge for holding said jaws in spaced relation to the male die member; means controlled by the movement of the first female die in its forming operation to remove the wedge and permit the clamp jaws to engage the formed wire strip and clamp it to the male die member; means for separating the female and male die members; a second female die member having a surface adapted to cooperate with the other forming surface of the male die member to give the loop-formed wire strip a second conformation; means for moving said second female die member into cooperative engagement with the male die member; and means carried by the second female die member and adapted, when said member reaches its proper position relative to the male die member to move the clamp jaws into spaced relation with the male die member, whereby the wedge will again enter between the said jaws to hold them in inoperative position.

14. Apparatus for forming a strip of wire into armature conductors comprising in combination, a male die member having a plurality of forming surfaces; a female die member having a surface adapted to cooperate with one of the male die forming surfaces to give the wire strip one conformation; means for moving said female die member relative to the male die member to complete said one conformation; a clamp including jaws adapted to move into engagement with the male die member; a wedge for holding said jaws in spaced relation to the male die member; means controlled by the movement of the first female die in its forming operation to remove the wedge and permit the clamp jaws to engage the formed wire strip and clamp it to the male die member; means for separating the female and male die member; a second female die member having a surface adapted to cooperate with the other forming surface of the male die member to give the loop-formed wire strip a second conformation; means for moving said second female die member into cooperative engagement with the male die member; and camming plates adjustably carried by the second female die member and adapted, when said die member reaches its proper position relative to the male die member to move the clamp jaws into spaced relation with the male die member, whereby the wedge will again enter between the said jaws to hold them in inoperative position.

15. The method of forming a single turn armature conductor which consists in bending a flat-sided bar in one plane to form an open loop having a yoke and branch portions whose respective sides lie in parallel planes, then bending the yoke so that the sides of the branches lie in intersecting planes the intersection of which is more remotely spaced from one branch than the other.

16. The method of forming a single turn armature conductor which consists in bending a flat-sided bar in one plane to form an open loop having a yoke and branch portions whose respective sides lie in parallel planes, then bending the yoke so the sides of the branches lie in intersecting planes so that the one branch is spaced farther from the intersection of said planes than the other branch a distance substantially equal to the width of the branches.

17. The method of forming a single turn armature conductor which consists in bending a flat-sided bar in one plane to form an open loop having a V-shaped yoke and branch portions continuing from the diverging portions of the yoke, the various portions of the loop being in substantially the same plane as viewed from the end of the conductor; then forming the diverging portions of the yoke so that the sides of the branch portions lie in intersecting planes respectively, the one branch being spaced more remotely from said point of intersection than the other.

18. The method of forming a single turn armature conductor which consists in bending a bar, having an oblong cross-section, flatwise in one plane to form an open loop having a yoke and branch portions so that the wider sides of the branch portions are in substantially parallel planes, then bending the yoke edgewise so that the wider sides of the respective branches lie in intersecting planes.

19. The method of forming a single turn armature conductor which consists in bending a bar, having an oblong cross-section, flatwise in one plane to form an open loop having a yoke and branch portions so that the wider sides of the branch portions are in substantially parallel planes, then bending the yoke edgewise so that the wider sides of the respective branches lie in intersecting planes, and that the one branch is more remotely spaced from the intersection of the said oblique planes than the other.

20. The method of forming a single turn armature conductor which consists in bending a bar, having an oblong cross-section, about axes parallel to its longer sectional dimension to form an open loop having branch portions joined to yoke, V-shaped as it appears in the edge view of the conductor, and then bending the yoke portion about axes transverse to the axes of bending in the first step to throw the respective branch portions into intersecting planes the intersection of which is spaced more remotely from the one branch than from the other.

21. The method of forming a single turn armature conductor which consists in bending a flat-sided bar in one plane to form an open loop having a yoke and branch portions whose respective sides lie in parallel planes, then bending the yoke so that the sides of the branches lie in intersecting planes the intersection of which is more remotely spaced from one branch than the other, and forming the branch portions into parallel inductor portions each joined with a lead portion offset from but parallel with the inductor portion.

22. The method of forming a single turn armature conductor which consists in bending a flat-sided bar in one plane to form an open loop having a V-shaped yoke and branch portions continuing from the diverging portions of the yoke, the various portions of the loop being in substantially the same plane as viewed from the end of the conductor; then forming the diverging portions of the yoke so that the sides of the branch portions lie in intersecting planes respectively, the one branch being spaced more remotely from said point of intersection than the other, and forming the branch portions into parallel inductor portions each joined with a lead portion offset from but parallel with the inductor portion.

23. Apparatus for making armature conductors comprising in combination, means for forming a strip of flat-sided wire into an open loop having a yoke and branch portions substantially in the same plane and the flat sides of the branch portions in substantially parallel planes; and means for bending only the yoke to throw the flat sides of the branch portions into intersecting planes the intersection of which is spaced more remotely from the one branch than from the other.

24. Apparatus for making armature conductors comprising in combination, cooperating die members for forming a strip of flat-sided bar stock into an open loop having a yoke and branch portions substantially in the same plane, the flat sides of the branches being in substantially parallel planes; and a second set of cooperating die members, movable transversely to the movement of the first mentioned die members for bending the yoke to throw the branch portions into intersecting planes, one branch being spaced more remotely from the intersection of said intersecting planes than the other, and for forming the branch portions into parallel inductor portions joined with a lead portion parallel to the respective branch portions but offset therefrom.

25. Apparatus for forming hairpin conductors comprising, in combination, mechanism for bending an intermediate portion of a strip of wire in one plane to produce approximately the desired configuration of the hairpin yoke as it appears in the plan view of the conductor and for spacing apart the branches approximately as they will be spaced in the completed conductor, the plan view being the view normal to a plane containing the branches; mechanism for bending said intermediate portion transversely to the first mentioned plane of bending in order to produce the desired configuration of the hairpin yoke as it appears in the end view of the conductor; and means for causing said mechanisms successively to bend the strip of wire.

26. The method of forming hairpin conductors which comprises bending an intermediate portion of a strip of wire in one plane to produce approximately the desired configuration of the hairpin yoke as it appears in the plan view of the conductor and to produce a spacing of the hairpin branches which approximates the spacing of the branches of the completed conductor, the plan view being a view normal to a plane containing the branches, and bending said intermediate portion transversely to the first mentioned plane of bending in order to produce the desired configuration of the hairpin yoke as it appears in the end view of the conductor.

In testimony whereof I hereto affix my signature.

JOHN J. CARTER.